Jan. 21, 1936.  H. SWAN ET AL  2,028,712
PRINTING PLATE
Filed May 26, 1934
*Plate*
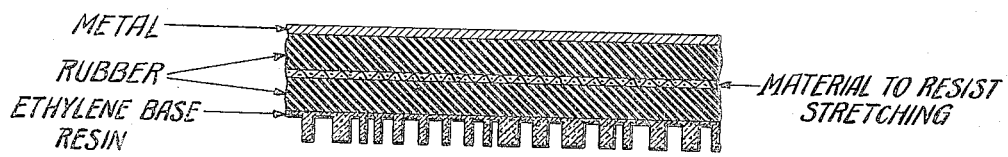
METAL
RUBBER
ETHYLENE BASE RESIN
MATERIAL TO RESIST STRETCHING
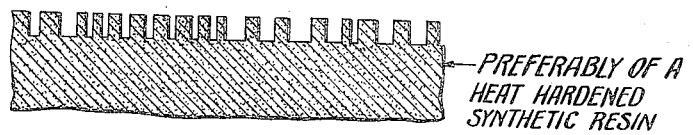
PREFERABLY OF A HEAT HARDENED SYNTHETIC RESIN
*Matrix*
INVENTORS
Hylton Swan
Siofried Higgins
BY  ATTORNEY Patented Jan. 21, 1936

2,028,712

UNITED STATES PATENT OFFICE 2,028,712

PRINTING PLATE

Hylton Swan, Upper Montclair, and Sigfried Higgins, Verona, N. J., assignors to Bakelite Corporation, New York, N. Y., a corporation of Delaware Application May 26, 1934, Serial No. 727,725

19 Claims. (Cl. 41—25)

This invention relates to a printing plate and method of preparing same.

The relief printing plates which are in common use today are, for the most part, provided with metallic faces. Printing plates with rubber and pheonolic resin faces have also been proposed. Plates composed entirely of acetyl cellulose and celluloid have also been disclosed but have found no favor in the art. The metal faced plates are relatively difficult to make and are expensive, taking into account the labor cost and time necessary to produce electrotypes and the high pressures necessary to produce a pressure molded metal face with its associated possibility of damaging the matrix where hard metal is used and the poor quality of the plate where softer metal is used. Rubber surfaced plates are subject to attack by the oils in the usual inks and phenolic resin printing surfaces are relatively brittle. Celluloid plates are a fire hazard. When used for the entire plate construction both celluloid and acetyl cellulose have certain disadvantages as they change dimension under atmospheric conditions more than the materials which we use.

Among the objects and features of the present invention is a plate which overcomes many of the faults of the prior art and which can be made easily and quickly from materials readily obtainable in the open market. The thin sheets of ethylene base resins exemplified by the vinyl resins, which we use as facing materials, are extremely tough and wear resistant, not attacked by oils, and have great resistance to wear in printing, together with high resistance to deterioration during use as well as in storage both before and after use. The vinyl resin molds more easily than metal for instance in a mold at approximately 150° C. a molding pressure of approximately 700 pounds per square inch may be used whereas with metal faces pressures in the neighborhood of 7000 pounds per square inch and upwards are usually found necessary in commercial practice. The printing surface readily takes ink from the inking rollers and gives it up to the paper and provides a tough surface which is not easily scratched. The resin has a slight but sufficient spring or resilient quality so that it is not damaged by grit or other small hard bodies which may be in the ink or paper, thus preventing the hard bodies from scratching or injuring the surface as they would permanently scratch a metal surface or possibly chip a surface of a phenol resin. Being tougher and not so brittle as a phenolic resin they do not require a filler to produce the required strength and thus the printing surface is very uniform. Many resins, for instance the phenol resins, require fillers for strength, as the resin itself is brittle, and the very finest fillers which are practical to give the required strength, may be as large as the small dots on a half tone plate or a great part of a larger size dot. When a plate of resin-filler composition wears to expose the filler, the surface of a dot or series of dots may thus be wholly or partly of filler, which has different ink receiving and delivering characteristics than the resin, and therefore the printing surface is not uniform. Furthermore, the fillers absorb moisture when exposed and swell, thus causing blurs. The resistance of the vinyl type resins to change in dimensions under the influence of moisture is an important factor when comparing them to printing plates of cellulose acetate or nitrate and the urea or thiourea resins. Furthermore the cellulose nitrate is dangerously inflammable and the urea resins are likely to crack either by blows or by ageing. The vinyl resins are unobjectionable in these characteristics and faithfully reproduce the smallest hair lines and dots on the matrix as well as the largest printing areas without the use of extremely high forming pressures which may damage the matrix surface. Moreover, the printing surface does not adhere to the surface of the synthetic resin matrices, which are highly desirable for use in forming the plate, due to their strength, light weight, durability and fidelity in reproducing the original type or other printing areas.

Other objects and features of the invention will be pointed out in the claims and will be understood from the following part of the specification wherein one of the preferred forms of the invention is disclosed, together with the drawing illustrating a plate and matrix.

The printing plates which we have invented, have a surface of the ethylene base resins and, in the preferred embodiment, a body of a yieldable material, for instance, rubber, although bodies of a hard material, for instance a phenolic resin, are not excluded. Vinyl resins and styrene resins having the desired characteristics for the printing surface, are on the market. In general these resins of the vinyl ester or ether type are made from unsymmetrically substituted ethylene derivatives and may be characterized as the polymerization product of substituted unsaturated aliphatic compounds. The commercial vinyl resins are usually mixtures of vinyl acetate and vinyl chloride, polymerized by heating in the presence of 0.1 per cent of benzoyl peroxide to a melting point between 70° C. and 200° C. These resins are permanently thermoplastic and readily moldable under heat and pressure yet, when at approximately room temperature, they are slightly resilient and very tough. Furthermore the characteristics of both the vinyl and styrene resins can be changed somewhat by the judicious use of modifying agents, plasticizers, waterproofing agents, waxes, etc., to produce variations in the characteristics. The toughness and strength of the vinyl resin is sufficient so that fine lines and small dots do not mushroom or spread when printing pressure is applied but the surface has a slight springy yield as compared to metal surfaces where a deformation leaves a permanent scar, or as compared to phenolic resin surfaces which are brittle and hard with no yield. The sheet of vinyl resin which we use may, for example, be from .001 to .035 of an inch in thickness, preferably without filler or other material which might change the printing characteristics of the plate. The vinyl resin is impervious to those ingredients in the usual inks which deteriorate rubber and thus the rubber body of the plate is thoroughly protected. The vinyl surfacing should be thicker than a varnish film as the resin is thermoplastic and molds into the depressions in the matrix. If insufficient resin is used to form a continuous layer on the rubber, the body is not protected from the oils in the inks and also unless the printing faces are firmly joined to an under layer they are likely to tear off of the base. Although we do not intend to exclude a facing built up to the required thickness by the repeated application of varnish layers or a facing molded of vinyl resin powder, a sheet of vinyl resin is greatly preferred for convenience in preparing the blanks and speed in molding the plates; and also because the amount of resin can be accurately determined, a continuous vinyl surface is provided and it is relatively even which latter characteristic might be difficult to obtain merely by spreading the vinyl molding powder over the matrix. The vinyl resin sheets may be roughened on one side, for instance by sand-blasting, to assist in bonding the sheet to the body.

Yieldable rubber is the preferred body material for our plate as this type of plate is thus of more general application, that is, it may be used to print on either smooth or roughened paper and can, when desired, be curved to fit a cylindrical roller thus enabling the plate to be used either on flat-bed or cylindrical types of presses. Furthermore, by virtue of its resiliency such a plate has the definite advantage of materially reducing the time required in accurately setting up the plate on the printing press, technically known as "make-ready". The rubber body should have sufficient yield to permit the plate to be used on rough paper but should not be extremely soft, particularly where the rubber body is thick, else the plate will not be solid enough to resist pull or movement in planes parallel to the surface, for accurate register, for instance in color work. This lateral displacement is particularly noticeable on rotary presses where, if the plate is too yieldable, there is a tendency for the printing surface of the plate to shift laterally with relation to the base at the time that the leading edge of the plate meets the impact of the impression cylinder. Thus a plate which has a relatively thin rubber body should contain rubber which is softer than the rubber in a plate having a thicker rubber body because with a thin rubber body, there is less of the elastic yieldable rubber to permit the plate to yield on rough paper and there is less tendency for the printing surface to shift laterally with regard to the base. In the case where a thick rubber body is used, it is of preferably harder rubber, sufficiently yieldable to permit of some compression when printing on rough paper but hard enough to resist lateral displacement of the printing surface. For relatively thin rubber bodies, for example where the rubber is from .125 to .150 of an inch in thickness, the body may test between 50 and 65 on the durometer and if a relatively thick rubber body, for example where the rubber is from .180 to .250 of an inch in thickness, the body may test between 60 and 75 on the durometer. The proper amount of yield may be obtained by regulating the quantity of vulcanizing agent, accelerators, etc., incorporated with the rubber or by incorporating fillers, for instance zinc oxide, carbon, barium sulphate, asbestos, etc. The preferred plate has a body of rubber including one or more sheets of absorbent paper or similar material, for instance, rubber impregnated blotting paper or cork product which is readily compressible but has relatively great resistance to stretch or movement in a plane parallel to the plane of the printing surface.

If desired, a metallic foundation plate or sheet may be fastened to the rear face of the rubber body to assist in holding the plate on the press. The rubber or rubber filler composition may thus be of a thickness sufficient to give a plate of the desired cross section or it may be thinner to allow for the thickness of the metal or other similar sheet.

An illustrative method of making the plate will now be described, it being understood that the description is by way of example only and that variations thereof may be made as desired.

The sheet of rubber either with or without filler or embedded fibrous material is first procured, this sheet should contain sufficient vulcanizing or curing agent to produce the required stiffness upon heating.

The rubber sheet is coated with an adhesive which adheres to both the rubber and the vinyl resin facing, for example, an acid degenerated rubber in a solvent solution. A general example of a suitable adhesive is a solution, emulsion or dispersion comprising rubber and benzol, the latter being a solvent for both rubber and vinyl resin. This cement may be used to coat the adjoining surfaces of the rubber and the vinyl resin, or a sheet of fibrous material, for example paper or cloth, may be coated or impregnated with this adhesive and used as an intermediate bond between the rubber and vinyl resin.

After coating the surface or surfaces to be joined, with the above adhesive or other suitable material, and preferably after waiting until the adhesive has become tacky, the sheets are assembled and compressed together to form a unitary composite sheet. If a metal foundation plate is used, the adjoining surfaces of the metal and rubber or an intermediate cementing agent may be coated or impregnated with a suitable metal-rubber adhesive, for instance, the adhesive previously given, and then brought together under pressure. Where the metallic sheet is used, it may be cemented to the rubber before, or after or during the time that the rubber is cemented to the vinyl resin facing. For plates to be curved subsequently, the metal plate is preferably affixed after curving. A stack of the assembled sheets may be held under pressure until the cement has thoroughly set. If desired, however, the composite sheets may be molded directly after assembly but if a wet adhesive is used, the press should be vented to allow the escape of the volatile ingredients of the adhesive.

Having made the plate blank, it may be formed into a printing plate in the following manner. The matrix used is preferably of a heat hardened synthetic resin, for instance a phenol formaldehyde condensation product which is unaffected by temperatures suitable for the vulcanization of the rubber and which does not adhere to the vinyl resin. The composite blank is laid in a press, preferably heated, with the vinyl resin face against the matrix and is subjected to heat and pressure until the printing surfaces have been formed on the face and preferably until the rubber has reached the desired state of hardness. It is possible to remove the plate from the press before the rubber has vulcanized sufficiently to give the desired stiffness and then continue the heating in an oven but this is not recommended as the plate may be damaged by such removal and the oven heating must be carefully regulated so as not to melt the characters on the vinyl resin surface. The molding of the printing face preferably takes place in a semi-positive mold so that there is some check offered to the side flow of the plastic material, which gives a plate with a substantially uniform density and definition at the corners and edges, and the mold should be cool before removal of the plate so as to harden the resin face, which is permanently thermoplastic and not heat hardening as are the phenolic resins.

As the mold heats, the vinyl resin and the rubber soften and are pressed towards the matrix, forcing the resin surfacing to flow and conform to and thus fill, and reproduce the reverse of the matrix surface. The vinyl resin softens and flows before the rubber (or phenol resin) body sets so that the plastic body acts as a hydrostatic cushion while the vinyl resin is taking the exact definition of the matrix face. Then the rubber (or phenol resin) hardens so that a very uniform plate is obtained. The mold is thereafter cooled sufficiently to harden the vinyl resin face and prevent injury to the printing characters when the plate is removed from the mold and matrix.

The vinyl resin need contain no filler and thus the printing surface is very uniform, and the vinyl resin sheet is thick enough so that the characters as well as the base layer of the printing surface are all of the same material, which would not be the case if a rubber body sheet were merely varnished with a vinyl resin solution and then molded. The plate thus has a permanent tough printing surface which is smooth and relatively hard yet sufficiently yieldable to print on rough paper. The surface does not scratch easily as does a surface of metal soft enough to be formed by a corresponding pressure, nor do the small printing areas, for instance the fine dots on photographic-screen-reproduced printing areas, spread or mushroom under repeated impacts of the inking rollers or impression cylinder as would the soft rubber without the vinyl resin facing.

In the case where the body of the plate is made from a phenolic resin, the vinyl resin sheet may be coated with a suitable cement, for instance, that previously given and cemented to sheets of paper or other fibrous material impregnated with a phenolic resin as is usual in the production of laminated phenolic resin boards or panels. The acid degenerated rubber will adhere to both vinyl resin and phenolic resin. The vinyl resin sheet may also be coated with the degenerated rubber adhesive and placed in the mold with sufficient phenolic-resin powder or sheet stock or preformed shapes above it to give the required thickness of the plate. In still another form, a sheet of fibrous material, such as those previously mentioned, may be impregnated with the degenerated rubber adhesive or may be coated on one side with a varnish containing vinyl resin and on the other side with a varnish containing phenol resin and then used as an intermediate bond between the vinyl resin facing and the phenolic resin body. The vinyl resin sheet and the phenolic resin (either powder or laminated, paper, and sheet stock), are then consolidated under heat and pressure in a mold using the intermediate fibrous bonding sheet or not, as desired. The vinyl resin flows and takes the form of the matrix as previously stated, while the phenol resin hardens under the heat and pressure. The finished plate has the tough surface of the vinyl resin and the hard backing of the phenol resin but the surface will not crack or chip as would a pure phenol resin surface and the plate is strengthened and reinforced by the vinyl resin surface sheet.

A preferred form of the invention has been described but it is not intended to exclude modifications thereof. The phenol resin body may, in certain situations, be replaced by other synthetic resin compositions, for instance the urea and thiourea resins. Bodies of synthetic rubbery products may also be used in certain situations, for instance, materials such as the hydrochloride divinyl acetylene product one form of which is sold as Duprene, vulcanized sulphur hydrocarbon products one form of which is known as Thiocol, factis, or a rubbery fatty-oil-phenolic-methylene product. The oxidized fatty oils, for instance oxidized linseed oil, may be used in part as a modifying agent for the rubber or rubber substitute, as may other modifiers. It is therefore recognized that there are many variations of the invention and it is desired that the invention be construed as broadly as the claims taken in conjunction with the prior art may allow.

We claim:—

1. A printing plate comprising a facing of vinyl resin and a body of another material.

2. A printing plate having a facing presenting printing characters of an ethylene base resin.

3. A printing plate having a thin continuous facing presenting printing characters of an ethylene base resin.

4. A printing plate having a facing presenting printing characters of an ethylene base resin without filler.

5. A printing plate having a facing comprising an ethylene base resin presenting molded printing characters of the same resin unitary with the facing.

6. A printing plate comprising a facing of vinyl resin and a body of a heat hardened material.

7. A printing plate having a facing comprising an ethylene base resin presenting molded printing characters.

8. A printing plate having a facing presenting printing characters of an ethylene base resin without exposed filler.

9. A printing plate comprising a facing of an ethylene base resin and a body including another resin.

10. A printing plate comprising a facing of styrene resin and a body of another material.

11. A printing plate having a facing comprising an ethylene base resin and a body comprising rubber.

12. A printing plate having a facing comprising an ethylene base resin, a yieldable body and a layer of stretch resisting material substantially parallel to the facing.

13. A printing plate having a facing comprising an ethylene base resin and a yieldable body.

14. A printing plate having a facing comprising an ethylene base resin and a body comprising vulcanized rubber.

15. A printing plate having a facing comprising an ethylene base resin, a yieldable body and a stretch resisting material embedded in the plate.

16. A printing plate having a facing comprising a thermoplastic ethylene base resin and a yieldable body.

17. Method of producing a printing plate comprising forming a composite sheet having a facing of an ethylene base resin and a body of another material, laying the composite sheet in molding position with the resin facing toward a matrix, and subjecting the assembled parts to pressure to mold a printing surface on the resin from the matrix.

18. Method of producing a molded composite piece which comprises forming a composite sheet having a facing of an ethylene base resin and a body of another material capable of deformation under heat and pressure, laying the composite sheet in molding position with the resin face toward a form, and subjecting the assembled parts to heat and pressure to mold the resin from the form.

19. Method of manufacturing plates having topically raised and depressed areas of an ethylene base resin and bodies of another material which comprises uniting the said resin and the body and molding the said resin against a matrix having a face of a different hardened synthetic resin.

HYLTON SWAN.
SIGFRIED HIGGINS.